(12) United States Patent
Chang et al.

(10) Patent No.: US 12,339,714 B2
(45) Date of Patent: Jun. 24, 2025

(54) HOUSINGS FOR ELECTRONIC DEVICES

(71) Applicant: Hewlett-Packard Development Company, L.P., Spring, TX (US)

(72) Inventors: Chi Hao Chang, Taipei (TW); Hendry Huang, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 223 days.

(21) Appl. No.: 18/011,493

(22) PCT Filed: Jul. 27, 2020

(86) PCT No.: PCT/US2020/043667
§ 371 (c)(1),
(2) Date: Dec. 19, 2022

(87) PCT Pub. No.: WO2022/025859
PCT Pub. Date: Feb. 3, 2022

(65) Prior Publication Data
US 2023/0259179 A1    Aug. 17, 2023

(51) Int. Cl.
*G06F 1/00*    (2006.01)
*G06F 1/16*    (2006.01)
*H01Q 1/22*    (2006.01)
*H01Q 1/40*    (2006.01)

(52) U.S. Cl.
CPC .......... *G06F 1/1698* (2013.01); *G06F 1/1656* (2013.01); *H01Q 1/22* (2013.01); *H01Q 1/40* (2013.01)

(58) Field of Classification Search
CPC ....... G06F 1/1698; G06F 1/1656; H01Q 1/22; H01Q 1/40
See application file for complete search history.

(56) References Cited

U.S. PATENT DOCUMENTS

| | | | |
|---|---|---|---|
| 2004/0178960 A1* | 9/2004 | Sun | H01Q 1/243 343/700 MS |
| 2006/0009251 A1* | 1/2006 | Noda | H01Q 7/00 455/550.1 |
| 2006/0152417 A1* | 7/2006 | Ying | H04M 1/03 343/702 |
| 2010/0073241 A1* | 3/2010 | Ayala Vazquez | H01Q 1/2266 343/702 |
| 2010/0073255 A1 | 3/2010 | Noll et al. | |
| 2013/0334168 A1 | 12/2013 | Huang | |
| 2014/0306263 A1 | 10/2014 | Garbar et al. | |

(Continued)

FOREIGN PATENT DOCUMENTS

| | | | | |
|---|---|---|---|---|
| EP | 1988601 A1 * | 11/2008 | | H01Q 1/40 |
| JP | 2008-028453 A | 2/2008 | | |
| KR | 10-1356356 B1 | 1/2014 | | |

*Primary Examiner* — Pete T Lee
(74) *Attorney, Agent, or Firm* — Shook, Hardy & Bacon L.L.P.

(57) ABSTRACT

The present disclosure is drawn to housings for electronic devices. In one example, a housing for an electronic device can include a rigid substrate having an exterior surface including a recessed region positioned at an opening extending through the rigid substrate connecting the recessed region to an interior surface of the rigid substrate. A conductive metal antenna is conformally carried by the recessed region and positioned at the opening.

18 Claims, 6 Drawing Sheets

(56) References Cited

U.S. PATENT DOCUMENTS

2018/0081284 A1 3/2018 Lafarre et al.
2020/0074264 A1 3/2020 Koeppel et al.
2020/0302262 A1* 9/2020 Higuchi ........... G06K 19/07758

* cited by examiner

HOUSINGS FOR ELECTRONIC DEVICES

BACKGROUND

The use of personal electronic devices of all types continues to increase. Cellular phones, including smartphones, have become nearly ubiquitous. Tablet computers have also become widely used in recent years. Portable laptop computers continue to be used by many for personal, entertainment, and business purposes. For portable electronic devices in particular, much effort has been expended to make these devices more useful and more powerful while at the same time making the devices smaller, lighter, and more durable. Even for non-portable devices, such as televisions and desktop computers, the size or thickness of these devices is a design concern. The aesthetic design of personal electronic devices is also of concern in this competitive market. Devices such as mobile phones, tablets and portable computers are usually provided with a housing. The housing typically provides a number of functional features, e.g. protecting the device from damage.

DETAILED DESCRIPTION

The present disclosure describes housings for electronic devices that include an integrated antenna. In one example, a housing for an electronic device includes a rigid substrate having an exterior surface including a recessed region. The recessed region is positioned at an opening that extends through the rigid substrate. The opening connects the recessed region to an interior surface of the rigid substrate. The housing also includes a conductive metal antenna conformally carried by the recessed region. The conductive metal antenna is positioned at the opening. In some examples, the rigid substrate can include metal, plastic, carbon fiber, a composite, or a combination thereof. In certain examples, the rigid substrate can include the metal and the housing can also include an insulating layer electrically separating the conductive metal antenna from the metal of the rigid substrate. In other examples, the housing can also include a solid filler layer on the conductive metal antenna over the recessed region. The solid filler layer can have a surface flush with a region of the exterior surface adjacent to the recessed region. In further examples, the housing can also include a primer coat, a base coat, or both, over the conductive metal antenna and the exterior surface of the rigid substrate. The primer can include a polymer and the base coat can include a polymer and a pigment. In still further examples, the housing can include a top coat over the primer coat, base coat, or both. The top coat can include a thermal curing resin or an ultraviolet-curing resin. In certain examples, the conductive metal antenna can extend from the recessed region into the opening.

The present disclosure also describes electronic devices that can include the housing. In one example, an electronic device includes an electronic component and a housing enclosing the electronic component. The housing includes a rigid substrate having an exterior surface including a recessed region positioned at an opening extending through the rigid substrate connecting the recessed region to an interior surface of the rigid substrate. The housing also includes a conductive metal antenna conformally carried by the recessed region and positioned at the opening. In some examples, the electronic device can be a laptop computer, a desktop computer, a tablet computer, a smartphone, a television, or a printer. In further examples, the conductive metal antenna can be a WiFi antenna, a Bluetooth® antenna, a cellular antenna, or a combination thereof. In still further examples, the electronic component can be electrically coupled with the conductive metal antenna through the opening.

The present disclosure also describes methods of making housings for electronic devices. In one example, a method of making a housing for an electronic device includes: forming a recessed region in an exterior surface of a rigid substrate, forming an opening through the rigid substrate connecting the exterior surface to an interior surface thereof, wherein the recessed region is positioned at the opening, and conformally depositing a conductive metal in the recessed region to form a conductive metal antenna positioned at the opening and within the recessed region. In some examples, conformally depositing the conductive metal can include lithographically patterning the layer of conductive metal to form the conductive metal antenna. In other examples, conformally depositing the layer of conductive metal can include electrolessly plating the conductive metal and thickening the conductive metal by electroplating to form the conductive metal antenna. In further examples, the method can also include applying a primer coat, a base coat, or both, over the conductive metal antenna, and applying a top coat over the primer coat, base coat, or both, wherein the primer includes a polymer, wherein the base coat includes a polymer and a pigment, and wherein the top coat includes a thermal curing resin or an ultraviolet-curing resin.

It is noted that when discussing the housings, the electronic devices, or the method making the housings described herein, such discussions of one example are to be considered applicable to the other examples, whether or not they are explicitly discussed in the context of that example. For example, in discussing a metal alloy in the context of the housing, such disclosure is also relevant to and directly supported in the context of the electronic device, the method of making the housing, and vice versa.

Housings for Electronic Devices

The present disclosure describes housings for electronic devices that can include an integrated antenna. Many electronic devices include an antenna or multiple antennas to allow wireless connectivity. The antennas can allow devices to transmit and receive data wirelessly to and from other devices and wireless networks. Some examples of antennas that are often included in electronic devices include WiFi antennas, Bluetooth® antennas, cellular antennas, and others.

Many electronic devices are designed with the antenna or antennas located internally, inside a housing of the electronic device. This design can be used for aesthetic reasons, or to provide physical protection for the antennas, or for other reasons. However, in some cases the external housings of electronic devices can block, diminish, or otherwise interfere with the radio waves that are sent and received by the antennas. In particular, when the housing of the electronic device is made of metal, the housing can block radio waves from being received by or transmitted by the antennas. Some designs include a "window" in the metal housing that can include an opening in the metal housing with a plastic insert placed in the opening to provide a nonconductive area for the radio waves to pass through. However, these housings can still reduce the effectiveness of the antennas. This design also places an additional constraint on the design of the electronic device, because the antenna placement is constrained to locations near the plastic window. Additionally, the plastic window can increase the complexity of manufacturing the housing and may reduce the strength and/or aesthetic appeal provided by the metal housing.

The housings for electronic devices described herein can include an integrated antenna that is on or near an exterior surface of the housing. This can allow for stronger signal transmission, better signal receiving range, and a wider angle of transmission and receiving compared to designs having the antenna located inside the housing. With metal housings in particular, a metal housing can include an integrated antenna at or near the exterior surface so that the antenna can receive and transmit freely, without being blocked by the metal housing. The antenna can also operate without a plastic window formed in the metal housing. In other examples, the housing can be made of other materials such as plastic, carbon fiber, or others. Placing the integrated antenna on or near the exterior surface in these examples can also help to increase the range of the antenna. This design can also increase the available space inside the housing for other electronic components because the internal space is not occupied by the antenna.

In some examples, the housings for electronic devices described herein can include a rigid substrate such as metal, plastic, carbon fiber, or another rigid material. The rigid substrate can have an exterior surface with a recessed region. A conductive metal antenna can be conformally carried by the recessed region, meaning that the conductive metal antenna can conform to the shape of the surface of the recessed region. In some examples, the conductive metal antenna can be formed by depositing a layer of conductive metal on the surface of the recessed region. The rigid substrate can also include an opening that extends through the rigid substrate to connect the recessed region to an interior surface of the substrate. The conductive metal antenna can be positioned at the opening. Therefore, the antenna can be electrically connected to electronic components by accessing the antenna through the opening.

Figure 1A:
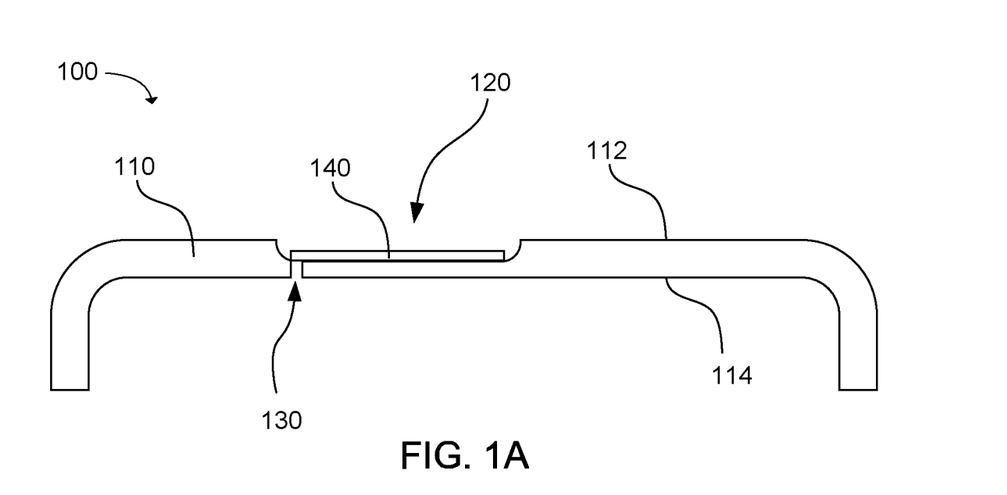
FIG. 1A is a cross-sectional view illustrating an example housing for an electronic device in accordance with examples of the present disclosure.

FIG. 1A is a cross-sectional view of one example of a housing 100 for an electronic device. The housing includes a rigid substrate 110 having an exterior surface 112 and an interior surface 114. A recessed region 120 is on the exterior surface. The recessed region is positioned at an opening 130 that extends through the rigid substrate connecting the recessed region to the interior surface of the rigid substrate. A conductive metal antenna 140 is conformally carried by the recessed region and positioned at the opening.

Figure 1B:
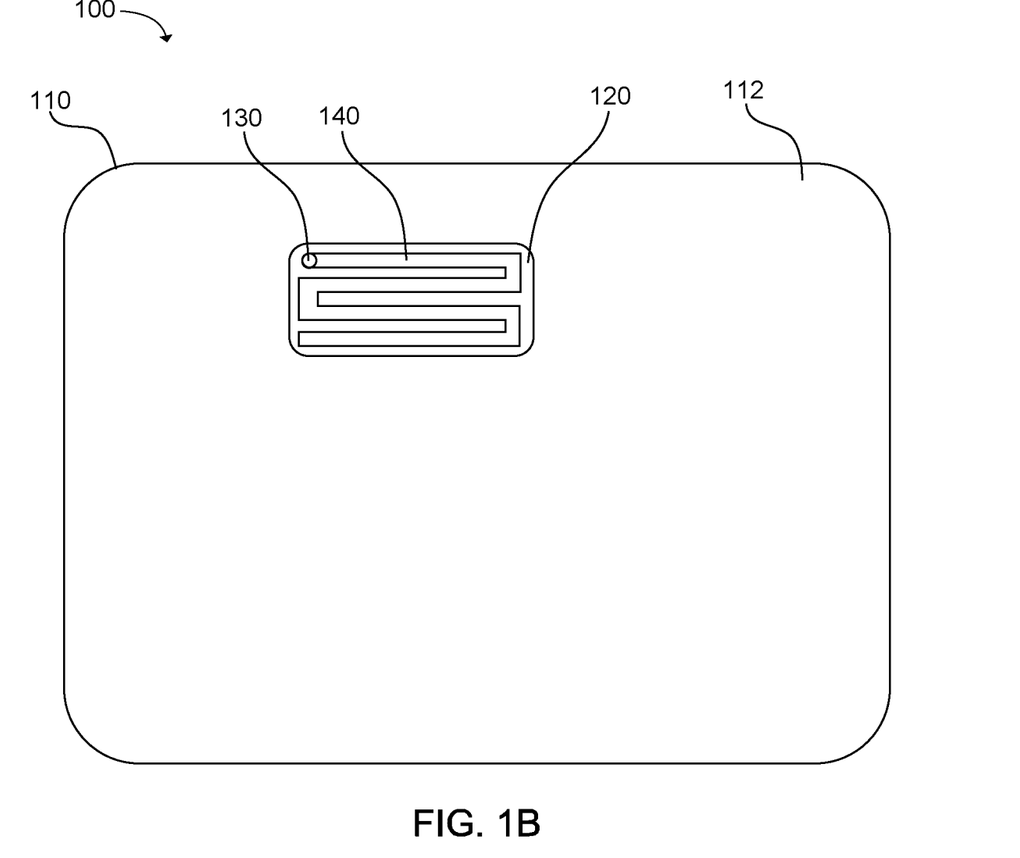
FIG. 1B is a top plan view of the example housing shown in FIG. 1A in accordance with examples of the present disclosure.

FIG. 1B is a top-down view of the housing 100 shown in FIG. 1A. The rigid substrate is shaped appropriately to enclose internal components of an electronic device. The view shown in FIG. 1B is facing toward the exterior surface 112 of the housing. The recessed region 120 is on the exterior surface. The opening 130 is located in the recessed region, and the conductive metal antenna 140 is conformally carried by the recessed region and positioned at the opening.

As used herein, the "exterior" and "interior" surfaces of a housing refer to the positions of the respective surfaces when the housing is assembled with electronic components to form an electronic device. The interior surface is the surface of the housing facing inward, toward the electronic components that are enclosed by the housing. The exterior surface is the surface facing outward.

Additionally, in many examples the housings described herein can be combined with additional housings to form an electronic device in which the internal electronic components are fully enclosed within the housings. Accordingly, a single housing may not make up the entire outer shell of an electronic device. Rather, in some examples, the outer shell of the electronic devices can be made up of multiple housings. For example, a laptop computer can include multiple housing pieces, such as a housing for the bottom of the keyboard portion of the laptop, a housing for the top of the keyboard portion of the laptop, a housing for the front of the monitor portion of the laptop, and another housing for the back of the monitor portion of the laptop. These pieces can individually be referred to as a "housing," and all these housings together can be used to enclose the electronic components of the laptop. Therefore, the term "enclosing" when used with respect to a housing enclosing electronic components, can mean a single housing fully enclosing the electronic components, or a single housing partially enclosing the electronic components, or a housing that can fully enclose the electronic components when used together with additional housings, or a housing that can partially enclose the electronic components when used together with additional housings. In many examples, an electronic device can include various openings in the housing, such as input/output ports, power jacks, vents, microphone openings, camera openings, monitor bezels, and so on.

In some examples, the housing can also include an insulating layer between the rigid substrate and the conductive metal antenna. This can be useful when the rigid substrate is a conductive material, such as metal. The insulating layer can electrically isolate the conductive metal antenna from the rigid substrate. In certain examples, the rigid substrate can include a metal, and the insulating layer can electrically separate the conductive metal antenna from the metal of the rigid substrate. In certain examples, the recessed region can be formed on the exterior surface of the rigid substrate and then the insulating layer can be formed so that the recessed region is coated by the insulating layer. The conductive metal antenna can then be formed over the insulating layer within the recessed region. In further examples, the opening can be formed connecting the exterior surface to the interior surface before the insulating layer is formed. The opening can be located in or adjacent to the recessed region so that the opening connects the recessed region to the interior surface of the substrate. The insulating layer can then be formed so that insulating material coats the recessed region and the surfaces of the opening. For example, if the opening is a circular hole formed through the substrate, then the insulating material can coat the sides of the hole. In certain examples, the insulating material can coat the sides of the hole and the coating can extend to the interior surface of the substrate. In other examples, the opening can be formed after the insulating layer has been formed, so that the surfaces of the opening are not coated with insulating material.

Figure 2:
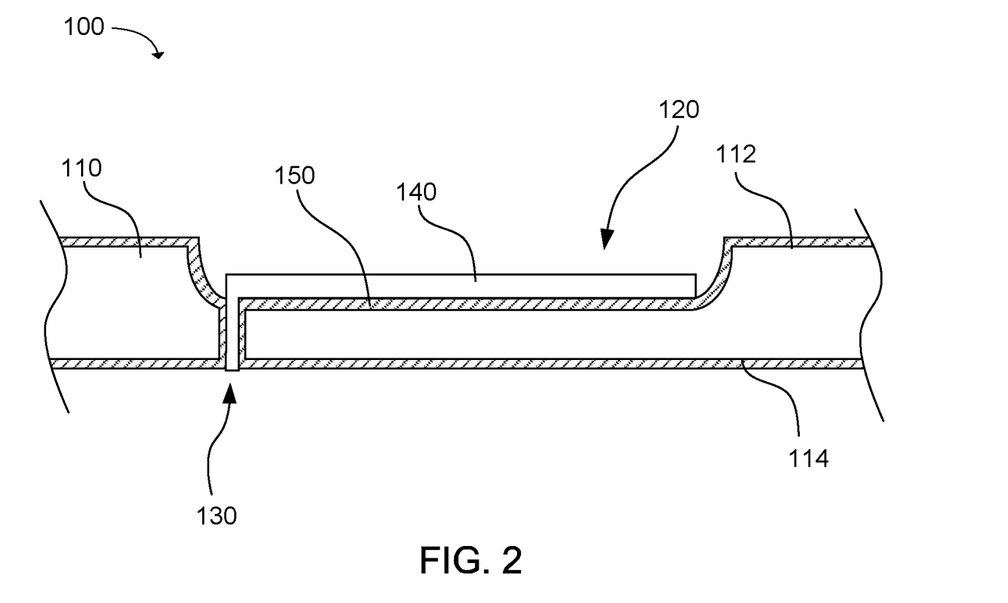
FIG. 2 is a cross-sectional view of another example housing for an electronic device in accordance with examples of the present disclosure.

FIG. 2 is a cross-sectional view of another example housing 100 that includes an insulating layer 150. The insulating layer separates the conductive metal antenna 140 from the rigid substrate 110. In this example, the exterior surface 112 and the interior surface 114 are both coated by the insulating layer. Additionally, the opening 130 has surfaces within the opening that are also coated by the insulating layer. In this example, the conductive metal antenna is shaped such that the antenna extends through the opening to the interior surface of the rigid substrate. Therefore, the insulating layer on the surfaces of the opening insulates the antenna from the rigid substrate throughout the opening. In certain examples, the conductive metal antenna can be electrically coupled to internal electronic components of an electronic device by connecting the antenna at the opening. In some examples, the antenna can be connected by soldering a wire to the antenna, forming a conductive trace to the antenna, directly connecting an electronic component to the antenna, or by another method.

In further examples, the recessed region can be smoothed over using a solid filler material, such as a hardening putty. For example, the filler material can be placed in the recessed region over the conductive metal antenna. The material can then be smoothed or sanded to form a smooth surface that is flush with the exterior surface of the rigid substrate around the recessed region.

Figure 3:
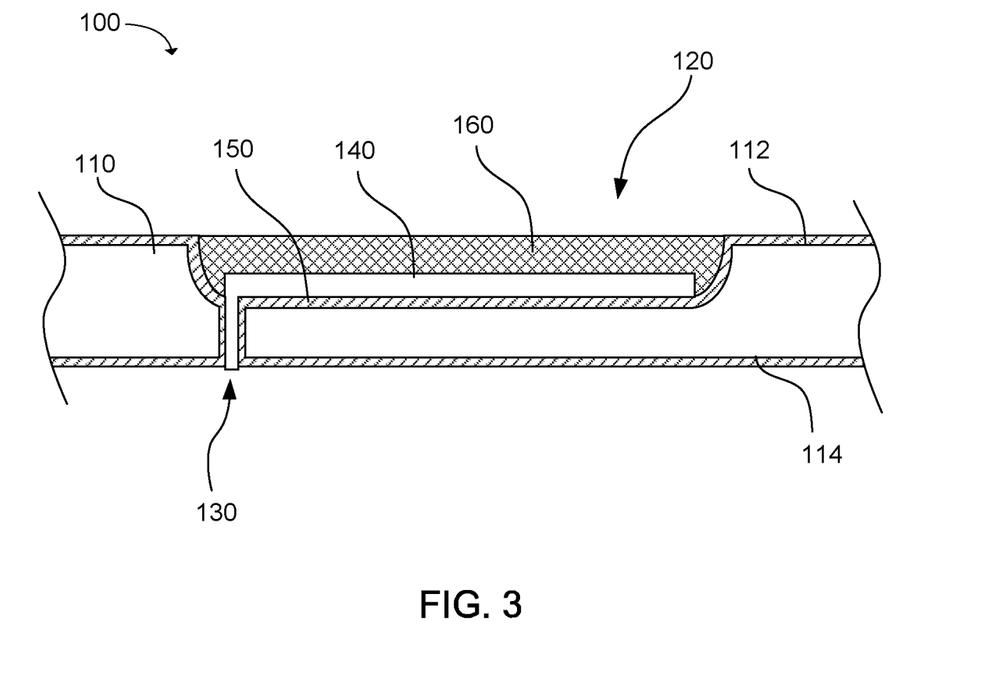
FIG. 3 is a cross-sectional view of another example housing for an electronic device in accordance with examples of the present disclosure.

FIG. 3 is a cross-sectional view of an example housing 100 that includes a solid filler layer 160 over the recessed region 120. The solid filler layer covers the conductive metal antenna 140. In this example, the solid filler layer has a surface that is flush with the exterior surface 112 adjacent to the recessed region. In examples that include an insulating layer 150 or any other layers formed before adding the solid filler material, the surface of the solid filler can be flush with the outermost surface, including such insulating layer or other layers. In examples that do not include an insulating layer or other layers applied to the rigid substrate 110 before the solid filler material, the solid filler can have a surface flush with the exterior surface of the rigid substrate itself. In other words, the solid filler can be flush with whatever is the outermost surface of the housing at the time the solid filler is added. In this way, the solid filler can form a smooth surface that hides the recessed region and the conductive metal antenna.

Figure 4:
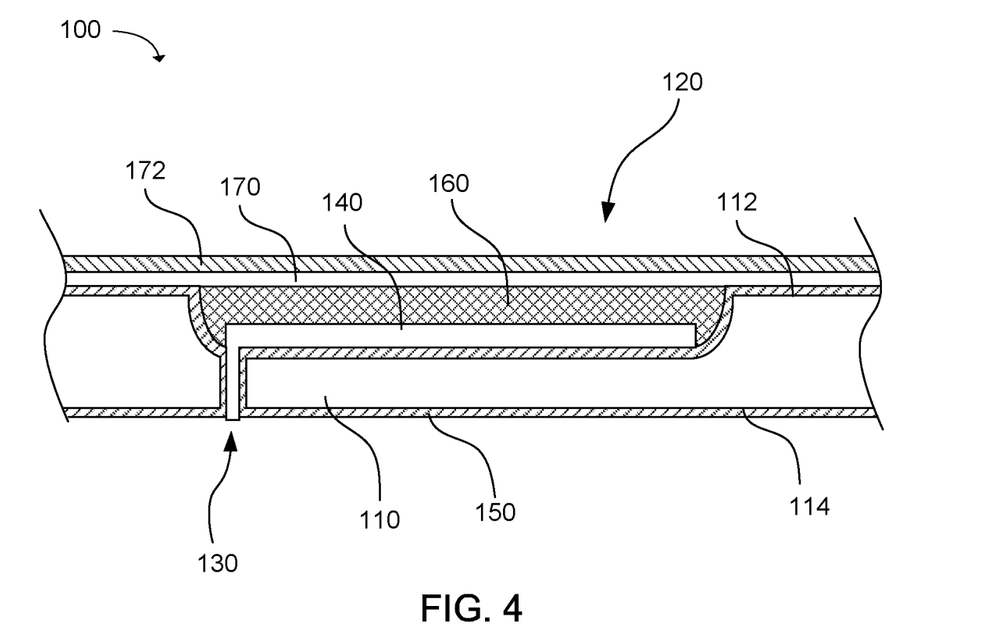
FIG. 4 is a cross-sectional view of yet another example housing for an electronic device in accordance with examples of the present disclosure.

In further examples, additional coating layers can be applied over the rigid substrate. Additional layers can include, for example, a primer coat, a base coat, a top coat, or combinations thereof. In certain examples, a primer coat can be applied first, followed by a base coat, followed by a top coat. Example compositions of these layers are described in more detail below. FIG. 4 shows one example housing 100 that includes a primer coat 170 and a base coat 172. The housing also includes a rigid substrate 110 as in the previous examples. The rigid substrate includes a recessed region 120 and an opening 130 connecting the recessed region to the interior surface 114 of the substrate. An insulating layer 150 is formed on the rigid substrate, and a conductive metal antenna 140 is formed over the insulating layer. A solid filler layer 160 is formed over the conductive metal antenna. The solid filler layer is smoothed over to be flush with the surface surrounding the recessed region. This creates a uniform surface on which the primer coat and base coat can be applied. In this example, the primer coat can include a polymer and the base coat can include a polymer and a pigment. The primer coat and/or base coat can be opaque to hide the solid filler in the recessed region.

Figure 5:
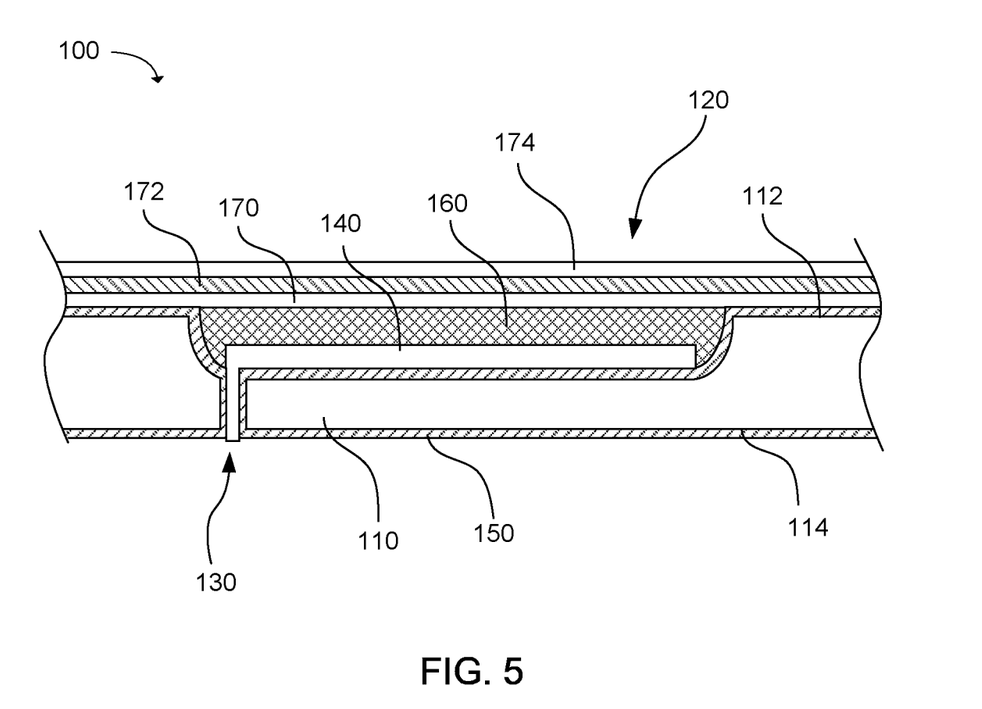
FIG. 5 is a cross-sectional view of still another example housing for an electronic device in accordance with examples of the present disclosure.

FIG. 5 is a cross-sectional view of another example housing 100. This example includes a primer coat 170 and base coat 172 applied over the solid filler 160 and the insulating layer 150, as in the previous example. This example also includes a top coat 174 applied over the base coat. In this example, the top coat can include a thermal curing resin or an ultraviolet-curing resin. In some examples, the top coat can provide additional protection and other properties to the housing.

Electronic Devices

As explained above, the housings described herein can be assembled with electronic components to form electronic devices. In some examples, multiple housings can be used to enclose internal electronic components. For example, a device such as a smart phone, tablet computer, or television can include a front housing and a back housing. Internal components such as processors, printed circuit boards, batteries, display screens, and others can be placed between the front housing and back housing so that the housings enclose the electronic components. In another particular example, the electronic device can be a laptop computer that includes a keyboard portion and a monitor portion connected by a hinge. Laptop covers sometimes include four separate housing pieces referred to as covers. The four separate laptop covers are often designated as cover A (a housing that is placed over the back of the monitor portion of the laptop), cover B (a housing placed over the front of the monitor portion), cover C (a housing that is placed on the top of the keyboard portion) and cover D (a housing that is placed on the bottom of the keyboard portion).

Figure 6:
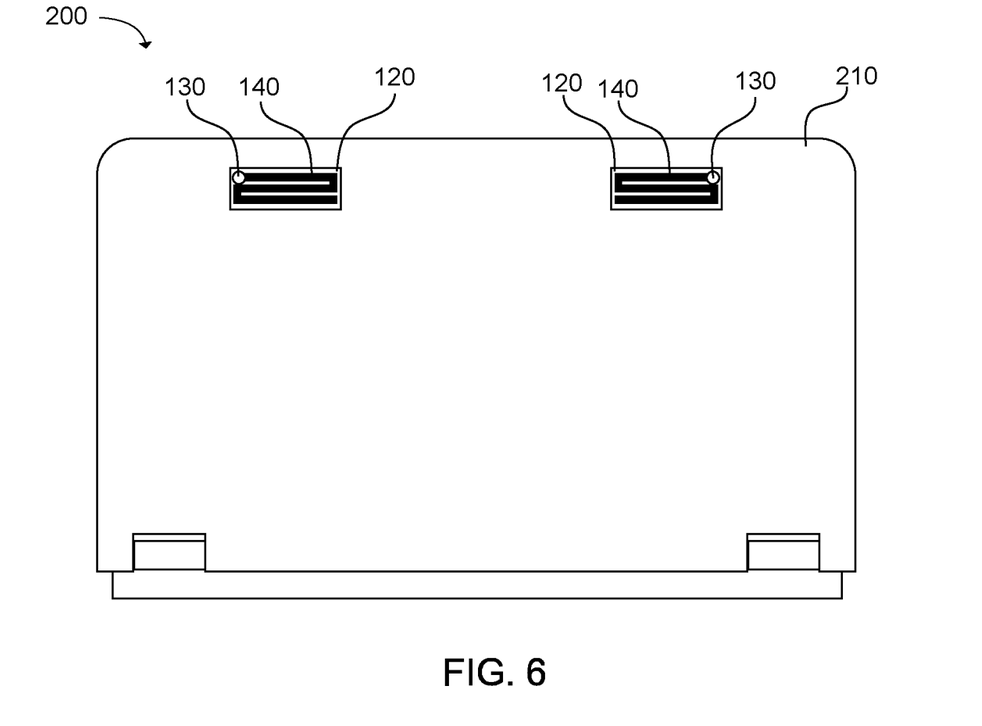
FIG. 6 is a top plan view of an example electronic device in accordance with examples of the present disclosure.

FIG. 6 shows an example electronic device 200 which is a laptop computer. The laptop computer has a cover A 210, or in other words, a housing located on the back of the monitor portion of the laptop computer, that includes two integrated conductive metal antennas 140. The cover includes two recessed regions 120 that conformally carry the conductive metal antennas. The cover also includes two openings 130 that allow the antennas to be connected to electronic components inside the laptop computer. Although not shown in this figure, the recessed regions can be filled in with a solid filler material and smoothed over, and then additional coatings can be applied such as the primer coat, base coat, and top coat mentioned above. With these additional coatings, the recessed regions and the conductive metal antennas can be hidden so that the cover has a uniform, smooth surface.

Figure 7:
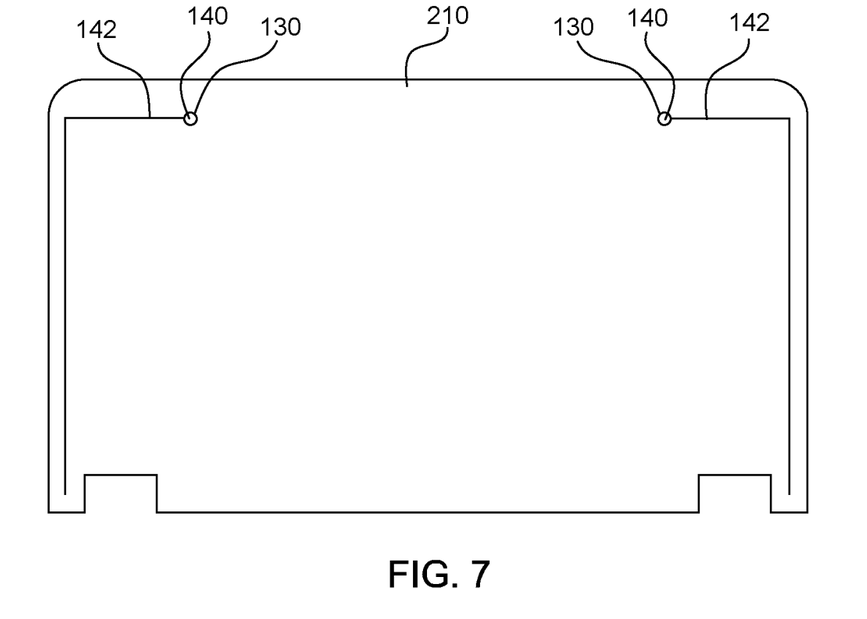
FIG. 7 is an interior view of an example housing for an electronic device in accordance with examples of the present disclosure.

FIG. 7 shows the example laptop cover A 210 from FIG. 6, as viewed facing toward the interior surface 114 of the cover. The two openings 130 in this example are two small holes that extend from the recessed regions to the interior surface of the cover. The conductive metal antennas 140 in this example also extend through the openings so that the antennas are exposed at the interior surface of the cover. The antennas are connected to wires 142 that can be soldered to the antennas at the interior surface of the cover. The wires can lead to an electronic component inside the laptop, such as a motherboard, WiFi adapter, Bluetooth® adapter, cellular modem, or others. Connecting the antennas to the internal electronic components in this way can provide flexibility in the placement of the antennas. In various examples, the antennas can be placed at any location on the housing where wires can reach to connect to the antennas.

Electronic components of the electronic device can be enclosed by the housing. As explained above, in some examples multiple housings can be used to enclose the electronic components. Electronic components that are "enclosed" by the housing can include electronic components that are completely enclosed or partially enclosed, by a single housing or by multiple housings. Many electronic devices include openings for charging ports, input/output ports, headphone ports, and so on. Accordingly, in some examples the housing can include openings for these purposes. Certain electronic components may be designed to be exposed through an opening in the housing, such as display screens, keyboard keys, buttons, track pads, fingerprint scanners, cameras, and so on. Accordingly, the housings described herein can include openings for these components. Other electronic components may be designed to be completely enclosed, such as motherboards, batteries, sim cards, wireless transceivers, memory storage drives, and so on.

In further examples, the electronic device can be a laptop, a desktop, a keyboard, a mouse, a printer, a smartphone, a tablet, a monitor, a television, a speaker, a game console, a video player, an audio player, or a variety of other types of electronic devices that include an antenna. Housings for these electronic devices can have a variety of designs, depending on the shape and size of the electronic device.

Methods of Making Housings for Electronic Devices

Figure 8:
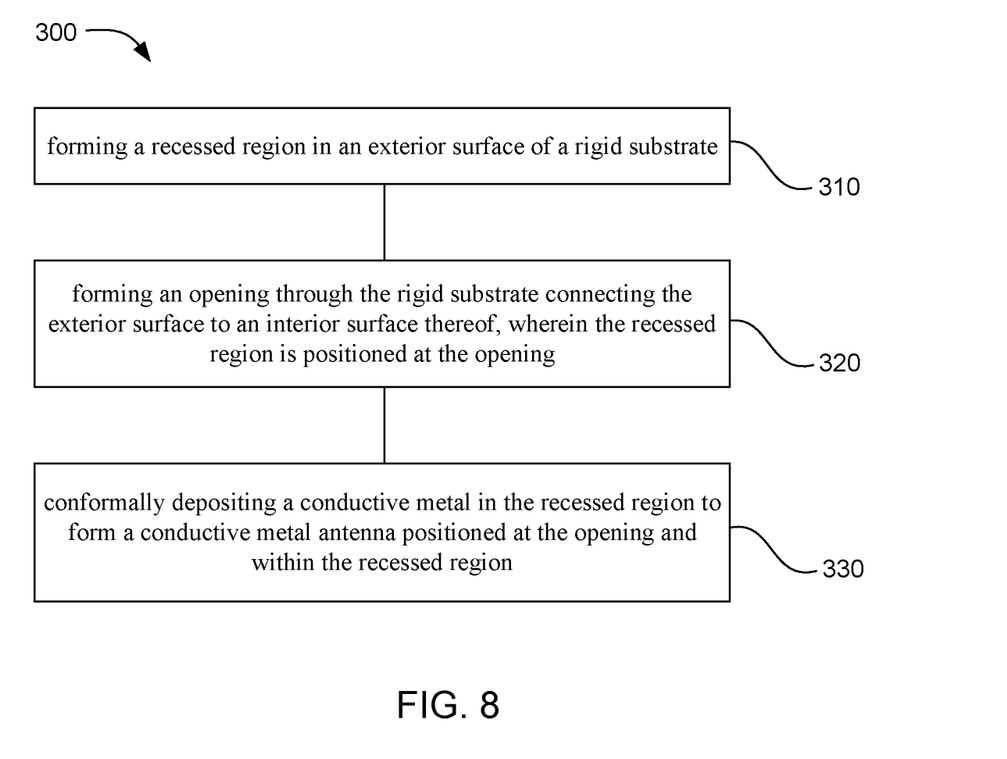
FIG. 8 is a flowchart illustrating an example method of making a housing for an electronic device in accordance with examples of the present disclosure.

The present disclosure also describes methods of making the housings for electronic devices described above. FIG. 8 is a flowchart of an example method 300 of making a housing for an electronic device. The method includes: forming a recessed region in an exterior surface of a rigid substrate 310; forming an opening through the rigid substrate connecting the exterior surface to an interior surface thereof, wherein the recessed region is positioned at the opening 320; and conformally depositing a conductive metal in the recessed region to form a conductive metal antenna positioned at the opening and within the recessed region 330.

The operations in the example method shown in FIG. 8 can be performed in a variety of orders, not limited to the order listed in the figure. In some examples, the recessed region can be formed first, followed by forming the opening connecting the recessed region to the interior surface, followed by conformally depositing the conductive metal antenna. However, in other examples, the conductive metal antenna can be deposited after forming the recessed region but before forming the opening. In further examples, the opening can be formed before the recessed region. Accordingly, these operations can be performed in a variety of orders.

The rigid substrate used to make the housings described herein can include a variety of rigid materials. In some examples, the rigid substrate can include metal, plastic, carbon fiber, a composite, or a combination thereof. In certain examples, the rigid substrate can include or consist of a light metal. The term "light metal" refers to metals and alloys that can be any metal of relatively low density including metal that is less than about 5 g/cm$^3$. In some cases, light metal can be a material including aluminum, magnesium, titanium, lithium, zinc, and alloys thereof. In further particular examples, the light metal substrate can include aluminum, an aluminum alloy, magnesium, or a magnesium alloy. Non-limiting examples of elements that can be included in aluminum or magnesium alloys can include aluminum, magnesium, titanium, lithium, niobium, zinc, bismuth, copper, cadmium, iron, thorium, strontium, zirconium, manganese, nickel, lead, silver, chromium, silicon, tin, gadolinium, yttrium, calcium, antimony, cerium, lanthanum, or others.

In some examples, the light metal substrate can include an aluminum magnesium alloy made up of about 0.5% to about 13% magnesium by weight and 87% to 99.5% aluminum by weight. Examples of specific aluminum magnesium alloys can include 1050, 1060, 1199, 2014, 2024, 2219, 3004, 4041, 5005, 5010, 5019, 5024, 5026, 5050, 5052, 5056, 5059, 5083, 5086, 5154, 5182, 5252, 5254, 5356, 5454, 5456, 5457, 5557, 5652, 5657, 5754, 6005, 6005A, 6060, 6061, 6063, 6066, 6070, 6082, 6105, 6162, 6262, 6351, 6463, 7005, 7022, 7068, 7072, 7075, 7079, 7116, 7129, and 7178.

In further examples, the light metal substrate can include magnesium metal, a magnesium alloy that is 99% or more magnesium by weight, or a magnesium alloy that is from about 50% to about 99% magnesium by weight. In a particular example, the light metal substrate can include an alloy including magnesium and aluminum. Examples of magnesium-aluminum alloys can include alloys made up of from about 91% to about 99% magnesium by weight and from about 1% to about 9% aluminum by weight, and alloys made up of about 0.5% to about 13% magnesium by weight and 87% to 99.5% aluminum by weight. Specific examples of magnesium-aluminum alloys can include AZ63, AZ81, AZ91, AM50, AM60, AZ31, AZ61, AZ80, AE44, AJ62A, ALZ391, AMCa602, LZ91, and Magnox.

The rigid substrate can be shaped to fit as a housing for any type of electronic device, including the specific types of electronic devices described herein. In some examples, the rigid substrate can have any thickness suitable for a particular type of electronic device. The thickness of the rigid substrate can be selected to provide a desired level of strength and weight for the housing of the electronic device. In some examples, the rigid substrate can have a thickness from about 0.5 mm to about 2 cm, from about 1 mm to about 1.5 cm, from about 1.5 mm to about 1.5 cm, from about 2 mm to about 1 cm, from about 3 mm to about 1 cm, from about 4 mm to about 1 cm, or from about 1 mm to about 5 mm, though thicknesses outside of these ranges can be used.

In certain examples, metal rigid substrates can be treated to include a protective oxide layer or a passivation layer. In some examples, a metal rigid substrate can be treated using micro-arc oxidation (MOA). Micro-arc oxidation, also referred to as plasma electrolytic oxidation, is an electrochemical process in which the surface of a metal is oxidized using micro-discharges of compounds on the surface of the substrate when immersed in a chemical or electrolytic bath, for example. The electrolytic bath may include predominantly water with about 1 wt % to about 5 wt % electrolytic compound(s), e.g., alkali metal silicates, alkali metal hydroxide, alkali metal fluorides, alkali metal phosphates, alkali metal aluminates, the like, and combinations thereof. The electrolytic compounds may likewise be included at from about 1.5 wt % to about 3.5 wt %, or from about 2 wt % to about 3 wt %, though these ranges are not considered limiting. In one example, a high-voltage alternating current can be applied to the substrate to create plasma on the surface of the substrate. In this process, the substrate can act as one electrode immersed in the electrolyte solution, and the counter electrode can be any other electrode that is also in contact with the electrolyte. In some examples, the counter electrode can be an inert metal such as stainless steel. In certain examples, the bath holding the electrolyte solution can be conductive and the bath itself can be used as the counter electrode. A high direct current or s alternating voltage can be applied to the substrate and the counter electrode. In some examples, the voltage can be about 200 V or higher, such as about 200 V to about 600 V, about 250 V to about 600 V, about 250 V to about 500 V, or about 200 V to about 300 V. Temperatures can be from about 20° C. to about 40° C., or from about 25° C. to about 35° C., for example, though temperatures outside of these ranges can be used. This process can oxidize the surface to form an oxide layer from the substrate material. Various metal or metal alloy substrates can be used, including aluminium, titanium, lithium, magnesium, and/or alloys thereof, for example. The oxidation can extend below the surface to form thick layers, as thick as 30 µm or more. In some examples the oxide layer can have a thickness from about 1 µm to about 25 µm, from about 1 µm to about 22 µm, or from about 2 µm to about 20 µm. Thickness can likewise be from about 2 µm to about 15 µm, from about 3 µm to about 10 µm, or from about 4 µm to about 7 µm. The oxide layer can, in some instances, enhance the mechanical, wear, thermal, dielectric, and corrosion properties of the substrate. The electrolyte solution can include a variety of electrolytes, such as a solution of potassium hydroxide. In some examples, the rigid substrate can include a micro-arc oxidation layer on one side, or on both sides.

In a particular example, the rigid substrate can include an alloy of aluminum, magnesium, or a combination thereof. The rigid substrate can be treated with micro-arc oxidation with a voltage from about 300 V to about 800 V for a time from about 5 minutes to about 25 minutes or until an oxide layer having a thickness from about 2 µm to about 15 µm has formed. The electrolytic bath used during micro-arc oxidation in this example can include sodium silicate, metal phosphate, potassium fluoride, potassium hydroxide, sodium hydroxide, fluorozirconate, sodium hexametaphosphate, sodium fluoride, ferric ammonium oxalate, phosphoric acid salt, graphite powder, silicon dioxide powder, polyethylene oxide alkylphenolic ether, or a combination thereof.

As mentioned above, a recessed region can be formed on the exterior surface of the rigid substrate. In some examples, the recessed region can be formed by removing material from a flat rigid substrate, such as by milling, drilling, grinding, laser ablation, or another method. In some examples, the recessed region can have a bottom surface that is below the original exterior surface of the rigid substrate, but which does not extend all the way through the substrate to the interior surface. The exception to this can be the opening that can be located in the recessed region or adjacent to the recessed region, which penetrates through the substrate to the interior surface. In other examples, the recessed region can be formed by stamping. For example, a thin substrate material can be stamped to have an area of the substrate recessed compared to the remainder of the exterior surface of the substrate. In still further examples, the rigid substrate can be prepared in such a way that the rigid substrate includes a recessed region. For example, the rigid substrate can be molded or die cast, and the mold used to form the shape of the rigid substrate can include the shape of the recessed region. Thus, the recessed region can be present at the moment the rigid substrate is formed.

In various examples, if the rigid substrate is made of a metal that can be subjected to micro-arc oxidation treatment, the substrate can be treated with micro-arc oxidation either before or after the recessed region has been formed. If the substrate is treated with micro-arc oxidation first, and then the recessed region is formed by cutting into the exterior surface, for example by CNC milling, then the recessed region can penetrate through the micro-arc oxidation layer. Alternatively, the recessed region can be formed before performing the micro-arc oxidation, and the micro-arc oxidation layer can be present on the surfaces of the recessed region.

The dimensions of the recessed region can be selected to provide a suitable space for the conductive metal antenna. In various examples, the recessed region can have a length and width from about 5 mm to about 100 mm, or from about 5 mm to about 50 mm, or from about 5 mm to about 25 mm, or from about 5 mm to about 10 mm, or from about 10 mm to about 25 mm, or from about 25 mm to about 50 mm. The depth of the recessed region can also be selected to provide a sufficient depth for deposition of the conductive metal antenna. In some examples, the recessed region can have a depth from about 0.1 mm to about 10 mm, or from about 0.1 mm to about 5 mm, or from about 0.1 mm to about 1 mm, or from about 0.1 mm to about 0.8 mm.

In further examples, an insulating layer can be applied to the rigid substrate after the recessed region has been formed and before the conductive metal antenna has been deposited. In particular examples, the insulating layer can be included when the rigid substrate includes a metal. The insulating layer can electrically insulate the conductive metal antenna from the metal substrate. The insulating layer can include a polymer that is non-conductive. In certain examples, the polymer can include polycarbonate, polyimide, polyurethane, polyethylene, polyamide, and polyvinylchloride. The insulating layer can be formed by applying an insulating coating composition. The insulating coating composition can be applied by a coating method such as dip coating, spraying, or another method. In some examples, the insulating coating composition can include the polymer in an amount from about 30 wt % to about 75 wt %. In further examples, the insulating coating composition can also include heat insulating materials such as fiberglass, glass wool, ceramic fiber, cellulose, cellular glass, elastomeric foam, phenolic foam, polyurethane foam, or polystyrene foam. In certain examples, the heat insulating material can be included in the composition in an amount from about 10 wt % to about 35 wt %. In some examples, the insulating coating composition can be a waterborne composition and the polymer can be an aqueous emulsion. The thickness of the insulating layer can be from about 1 µm to about 20 µm in some examples. In other examples, the thickness can be from about 5 µm to about 15 µm.

As explained above, a conductive metal antenna can be conformally carried by the recessed region in the rigid substrate. In some examples, methods of making housings for electronic devices can include forming the antenna by depositing a conductive metal in the recessed substrate. In certain examples, the antenna can be formed by depositing a layer of conductive metal and then patterning the layer of conductive metal to form the shape of the antenna. If an insulating layer is present, then the conductive metal can be deposited over the insulating layer. If a non-conductive material is used for the rigid substrate, then the conductive metal can be deposited directly onto the rigid substrate without an insulating layer.

In some methods, a layer of conductive metal can be deposited using an electroless plating process. Electroless plating refers to a chemical process in which metal is deposited on a surface through chemical reactions without application of electric current (as is used in electroplating). In some examples, an electroless plating process can include reducing metal cations in a liquid bath. For example, the liquid bath can include a solution of a metal salt and a reducing agent that can react with metal cations in the solution. When the metal cations are reduced, the metal cations can form a metallic layer on surfaces in contact with the liquid. Such a liquid composition can be applied to the rigid substrate (with or without an insulating layer as explained above). Any suitable application method can be used, such as dipping the substrate in the liquid composition, or spraying the liquid composition onto the substrate, or other methods. In some examples, the rigid substrate can be masked so that the metal deposits in a selected area, which can be within the recessed region of the substrate.

In certain examples, the conductive metal deposited by electroless plating can include copper, gold, silver, palladium, nickel, or a combination thereof. In a particular example, the conductive metal can be copper. In some cases, the rigid substrate can be treated with a catalyst before applying the electroless plating composition. In the case of copper electroless plating, a palladium catalyst can be used. After applying the catalyst, a composition including copper cations and a reducing agent can be applied to form electroless plated copper metal. Copper cations can be supplied from dissolved $Cu^{2+}$ salts, such as copper(II) sulfate, copper (II) chloride, or copper(II) phosphate. In some examples, the reducing agent can include formaldehyde. The electroless plating chemical reaction can be allowed to proceed until a thin coating of conductive copper has been formed. In certain examples, the copper coating can have a thickness of from about 100 nm to about 5 μm.

In further examples, the electroless plated conductive metal can be thickened by electroplating. Electroplating processes involve applying an electric current across two electrodes. The electroless plated metal coating can serve as one of the electrodes, onto which additional metal is to be electroplated. In some examples, the additional metal deposited by electroplating can be the same as the metal in the electroless plated metal coating. In other examples, a different metal can be electroplated. In a particular example, copper can be applied by electroless plating and then more copper can be deposited using electroplating. In a specific example, copper electroplating can be performed by immersing the electroless plated copper coating in a liquid bath including copper sulfate and sulfuric acid. A copper anode can be also be immersed in the bath, and the copper anode can be connected to the electroless plated copper coating so that the electroless plated coating is the cathode. Copper atoms can be converted to cations at the anode and then reduced at the cathode to deposit additional copper metal atoms over the electroless plated copper coating. The electroplating process can be continued until a desired thickness is reached. In some examples, the thickness of the metal coating after electroplating can be from about 5 μm to about 30 μm.

The metal coating formed by electroless plating and electroplating can then be patterned to form the antenna. In some examples, a lithographic process can be used to pattern the antenna. In more detail, a resist material and an etchant can be used to selectively remove portions of the metal coating, leaving behind the antenna having the desired shape. In certain examples, a positive or negative photoresist can be used. The photoresist can be patterned using light to form a mask having the shape of the antenna, and then an etchant can be applied to remove excess metal to form the antenna.

As explained above, an opening can be formed in the substrate to allow the antenna to be connected to electronic components inside the housing. In various examples, the opening can be located at the recessed region, meaning that the opening can be within the recessed region or adjacent to the recessed region. The opening can be located so that the antenna can be electrically connected to electronic components through the opening. Therefore, the opening can contact the antenna in some way that allows the antenna to contact a wire, a trace, a pin, or some other type of connection to electrically connect the antenna to an internal electronic component of the electronic device. The opening can be small as long as an electrical connection can be made to the antenna through the opening. In some examples, the opening can have a diameter or width from about 0.1 mm to about 1 mm, or from about 0.1 mm to about 0.5 mm.

In some examples, the method of making a housing for an electronic device can include forming the opening before adding the antenna. In a particular example, the opening can be formed by drilling or otherwise forming a hole through the rigid substrate. The formation of the opening can also be performed before or after forming the recessed region on the exterior surface of the rigid substrate. In certain examples, the opening can be formed in the rigid substrate and then an insulating layer can be formed over the rigid substrate. The insulating layer can coat the surfaces of the substrate, including the sides of the opening. The conductive metal antenna can then be added in a location that is at the opening. The antenna can be directly over the opening, or partially over the opening, or adjacent to the opening, or the antenna can have a shape that extends into the opening. In certain examples, the antenna can extend into the opening and all the way to the interior surface of the substrate. In a particular example, the antenna can be formed by electroless plating and electroplating processes, and these processes can deposit metal within the opening so that the antenna includes conductive metal lining the surfaces of the opening.

Figure 9:
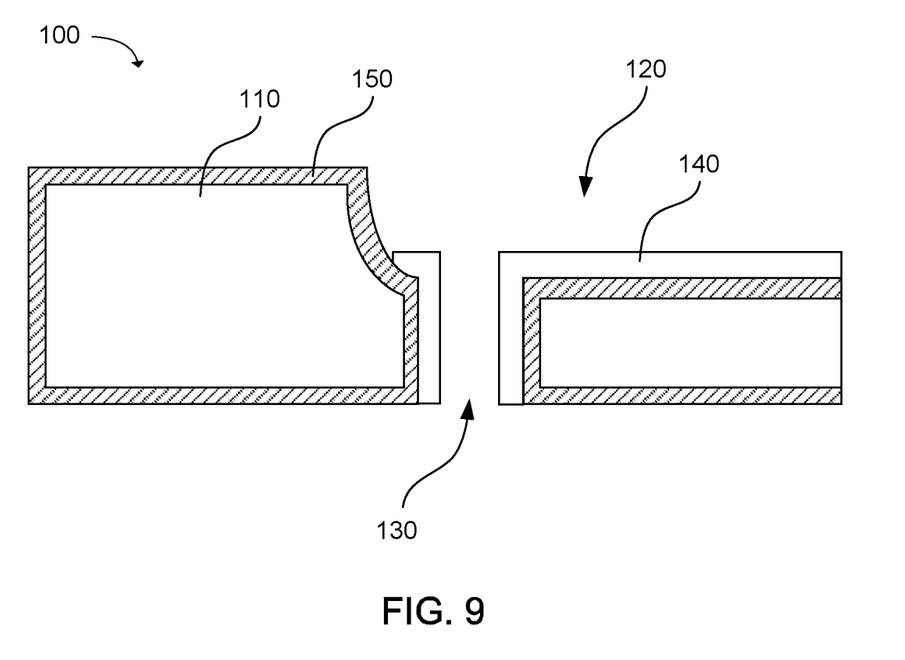
FIG. 9 is a cross-sectional view of another example housing for an electronic device in accordance with examples of the present disclosure.

FIG. 9 shows a close-up cross-sectional view of one example housing 100 made in this way. The housing includes a rigid substrate 110 with a recessed region 120. An opening 130 (hole) is formed through the substrate in the recessed region. An insulating layer 150 is then deposited onto the rigid substrate. A conductive metal antenna 140 is formed by a process including electroless plating, electroplating, and lithographic patterning as described above. The cross-section shown in this figure cuts through the middle of the opening to show the layers of insulating material and conductive metal on the inside surfaces of the opening. As shown in this figure, the conductive metal is plated within the opening so that a layer of conductive metal extends through the opening to the interior surface of the substrate. Although not shown in this figure, additional layers can be added over the antenna, such as the solid filler, primer, base coat, and top coat layers described above.

Figure 10:
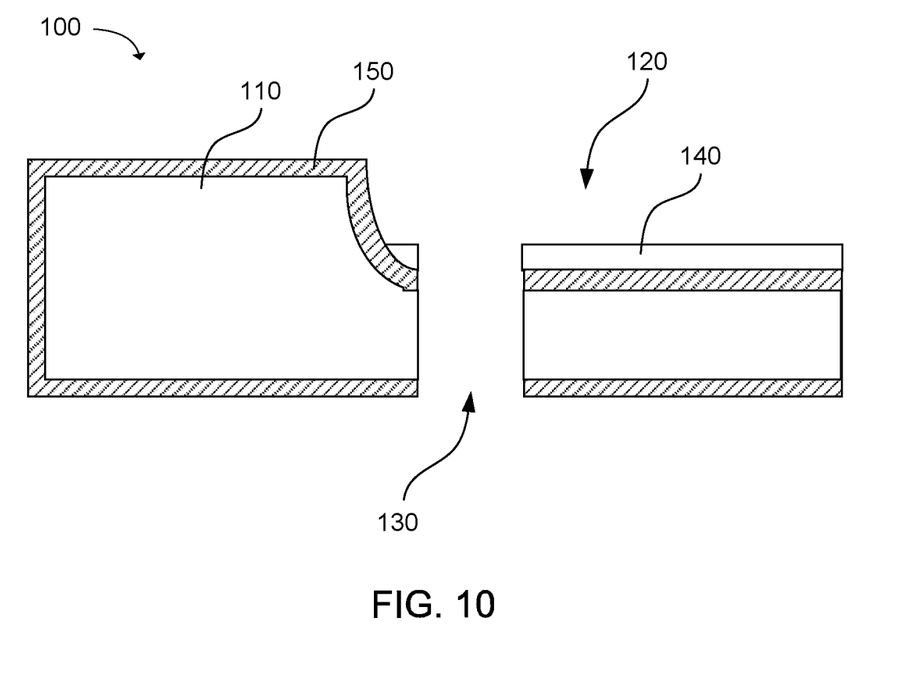
FIG. 10 is a cross-sectional view of yet another example housing for an electronic device in accordance with examples of the present disclosure.

In other examples, the method can include forming the opening after adding the antenna. For example, the antenna can be formed in the recessed region, and then a small hole can be drilled through the antenna or adjacent to the antenna. The hole can be located so that a wire, trace, pin, or other type of electronic connector can be connected to the antenna through the hole. FIG. 10 shows one such example housing 100. This housing includes a rigid substrate 110 with a recessed region 120, an insulating layer 150 over the substrate, and a conductive metal antenna 140 formed over the insulating layer. An opening 130 is formed by drilling through the antenna, the insulating layer, and the rigid substrate. The edge of the antenna is exposed at the opening, so that an electrical connection can be made to the antenna through the opening.

After the antenna has been placed in the recessed region of the substrate, the remaining recessed volume of the recessed region can be filled in using a filler composition. In some examples, this composition can be a "putty-like" material that can be placed in the recessed region over the antenna. The filler composition can be smoothed over to form a surface that is flush with the surrounding exterior surface of the substrate. If an insulating layer has been applied, then the filler composition can form a surface that is flush with the insulating layer on the substrate. The filler can be hardenable to form a solid filler that fills the recessed region.

In certain examples, the filler composition can include a resin and a particulate solid material. Non-limiting examples of the resin can include polyacrylic resin, polyester resin, polyurethane resin, and others. Particulate materials that can be used can include clay, titanium dioxide, talc, calcium carbonate, calcium sulfate, glass microspheres, and combinations thereof. In further examples, the filler composition can include a surfactant, such as an alcohol sulfate surfactant, an alkylbenzene sulfonate surfactant, sodium caseinate, sodium polyacrylate, sodium polyoxyethylene, alkylether carboxylate, sodium dodecyl sulfate, or others. The filler composition can also include a solvent, such as methyl ethyl ketone, methyl isobutyl ketone, 3-methoxy-3-methyl-1-butyl acetate, ethyl acetate, butyl acetate, or others. In certain examples, the filler composition can also include a biocide such as 2-mercaptobenzothiazole or glutaraldehyde. In some examples, the ingredients described above can be included in any combination in the filler composition. The amounts of the ingredients (if present) can be: about 10 wt % to about 20 wt % resin; about 30 wt % to about 50 wt % particulate solid material; about 0.3 wt % to about 2 wt % surfactant; about 25 wt % to about 35 wt % solvent; and about 0.1 wt % to about 0.5 wt % biocide.

In further examples, a primer coat can be applied after the solid filler material. The primer can include a polymer. In some examples, the polymer can include epoxy, epoxy-polyester, polyester, polyurethane, polyurethane copolymer, or a combination thereof. The primer coat can be formed applying a primer composition that includes the polymer using any suitable coating method, such as spraying, dipping, or other coating methods. In further examples, the primer coat can be thermally cured. The thermal curing can include heating the substrate with the primer composition coated thereon at a temperature from about 60° C. to about 80° C. for a time from about 15 minutes to about 40 minutes. In certain examples, the primer coat can have a thickness from about 10 µm to about 30 µm.

In still further examples, a base coat can be applied. The base coat can be applied over the primer coat. Alternatively, if no primer coat is used, then the base coat can be applied over the solid filler material, insulating layer, and/or the rigid substrate. The base coat can include a polymer and a pigment. In various examples, the polymer can include polyester, polyacrylic, polyurethane, polyurethane copolymer, or a combination thereof. The pigment can include carbon black, titanium dioxide, clay, mica, talc, barium sulfate, calcium carbonate, synthetic pigment, metallic powder, aluminum oxide, organic powder, inorganic powder, plastic beads, colored pigments, dyes, or combinations thereof. In some examples, the base coat can also be thermally cured. The thermal curing can include heating at a temperature from about 60° C. to about 80° C. for a time from about 15 minutes to about 40 minutes. In certain examples, the base coat can have a thickness from about 8 µm to about 20 µm.

A top coat can also be applied. If a primer coat and base coat are present, then the top coat can be applied over the primer coat and base coat. In some examples, the top coat can be thermally curable. In alternative examples, the top coat can be radiation curable. Thermally curable top coat compositions can include a polymer such as polyester, acrylic, polyurethane, or polyurethane copolymer. These materials can be cured by heating at a temperature from about 60° C. to about 80° C. for a time from about 15 minutes to about 40 minutes. Radiation curable top coat compositions can include polyacrylic, polyurethane, urethane acrylates, acrylic acrylates, or epoxy acrylates which can be cured by applying ultraviolet radiation. In some examples, the top coat composition can be cured by heating followed by applying ultraviolet radiation. Heating can be performed at a temperature from about 50° C. to about 60° C. for a time from about 10 minutes to about 15 minutes. Then, ultraviolet radiation can be applied with an exposure of from about 700 mJ/cm$^2$ to about 1,300 mJ/cm$^2$ in a time period from about 10 seconds to about 30 seconds. In certain examples, the top coat can have a thickness from about 10 µm to about 25 µm.

As used herein, a layer that is referred to as being "on" or "over" a lower layer can be directly applied to the lower layer, or an intervening layer or multiple intervening layers can be located between the layer and the lower layer. Accordingly, a layer such as a primer coat can be referred to as being "on" or "over" the rigid substrate and can be directly in contact with the rigid substrate, or there can be an intervening layer or multiple intervening layers, such as the insulating layer described that can be applied to the rigid substrate before the primer coat.

It is noted that when discussing housings for electronic devices, the electronic devices themselves, or methods of making housings for electronic devices, such discussions can be considered applicable to one another whether or not they are explicitly discussed in the context of that example. Thus, for example, when discussing the materials used in the rigid substrate in the context of one of the example housings, such disclosure is also relevant to and directly supported in the context of the electronic devices and/or methods, and vice versa. It is also understood that terms used herein will take on their ordinary meaning in the relevant technical field unless specified otherwise. In some instances, there are terms defined more specifically throughout or included at the end of the present disclosure, and thus, these terms are supplemented as having a meaning described herein.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 5% or other reasonable added range breadth of a stated value or of a stated limit of a range. The term "about" when modifying a numerical range is also understood to include the exact numerical value indicated, e.g., the range of about 1 wt % to about 5 wt % includes 1 wt % to 5 wt % as an explicitly supported sub-range.

As used herein, a plurality of items, structural elements, compositional elements, and/or materials may be presented in a common list for convenience. However, these lists should be construed as though the individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if individual numerical values and sub-ranges are explicitly recited. For example, a layer thickness from about 0.1 µm to about 0.5 µm should be interpreted to include the explicitly recited limits of 0.1 µm to 0.5 µm, and to include thicknesses such as about 0.1 µm and about 0.5 µm, as well as subranges such as about 0.2 µm to about 0.4 µm, about 0.2 µm to about 0.5 µm, about 0.1 µm to about 0.4 µm, etc.

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to to cover such modifications and arrangements.

Example

An example housing for an electronic device is made as follows. A light metal rigid substrate is made by molding magnesium alloy in the form of a laptop "cover A" shape. A CNC milling machine is used to form a recessed region in the exterior surface of the light metal rigid substrate. The light metal substrate is subjected to micro-arc oxidation to form a protective oxide coating on the light metal substrate. An insulating layer is formed over the light metal substrate, including a polyurethane polymer, with a thickness of about 10 µm. A layer of copper is deposited by electroless plating on the bottom of the recessed region. The layer of copper is thickened by electroplating additional copper onto the layer. The layer of copper is lithographically patterned to form an antenna conformally carried by the recessed region. A hole is drilled through the substrate at the antenna to allow the antenna to be electrically connected to internal electronic components inside the housing. A putty material is placed in the recessed region to fill the remaining volume of the recessed region. The putty material is smoothed and allowed to harden to form a solid filler that has a surface flush with the exterior surface of the rigid substrate. A primer coat, base coat, and top coat are applied.

What is claimed is:

1. A housing for an electronic device comprising:
    a rigid substrate having an exterior surface including a recessed region positioned at an opening extending through the rigid substrate connecting the recessed region to an interior surface of the rigid substrate;
    a conductive metal antenna conformally carried by the recessed region to and positioned at the opening; and
    a filler layer on the conductive metal antenna over the recessed region.

2. The housing for an electronic device of claim 1, wherein the rigid substrate comprises metal, plastic, carbon fiber, a composite, or a combination thereof.

3. The housing for an electronic device of claim 1, wherein the rigid substrate includes the metal and wherein the housing further comprises an insulating layer electrically separating the conductive metal antenna from the metal of the rigid substrate.

4. The housing for an electronic device of claim 1, wherein the filler layer is solid and has a surface flush with a region of the exterior surface adjacent to the recessed region.

5. The housing for an electronic device of claim 1, further comprising a primer coat over the conductive metal antenna and the exterior surface of the rigid substrate, wherein the primer includes a polymer.

6. The housing for an electronic device of claim 5, further comprising a top coat over the primer coat, wherein the top coat comprises a thermal curing resin or an ultraviolet-curing resin.

7. The housing of claim 1, wherein the conductive metal antenna extends from the recessed region into the opening.

8. An electronic device comprising:
    an electronic component; and
    a housing enclosing the electronic component, wherein the housing comprises:
    a rigid substrate having an exterior surface including a recessed region positioned at an opening extending through the rigid substrate connecting the recessed region to an interior surface of the rigid substrate,
    a conductive metal antenna conformally carried by the recessed region and positioned at the opening, and
    a filler layer on the conductive metal antenna over the recessed region.

9. The electronic device of claim 8, wherein the electronic device is a laptop computer, a desktop computer, a tablet computer, a smartphone, a television, or a printer.

10. The electronic device of claim 8, wherein the conductive metal antenna is a WiFi antenna, a Bluetooth® antenna, a cellular antenna, or a combination thereof.

11. The electronic device of claim 8, wherein the electronic component is electrically coupled with the conductive metal antenna through the opening.

12. A method of making a housing for an electronic device comprising:
    forming a recessed region in an exterior surface of a rigid substrate;
    forming an opening through the rigid substrate connecting the exterior surface to an interior surface thereof, wherein the recessed region is positioned at the opening;
    conformally depositing a conductive metal in the recessed region to form a conductive metal antenna positioned at the opening and within the recessed region; and
    placing a filler material in the recessed region over the conductive metal antenna.

13. The method of claim 12, wherein conformally depositing the conductive metal includes lithographically patterning the layer of conductive metal to form the conductive metal antenna.

14. The method of claim 12, wherein conformally depositing the layer of conductive metal includes electrolessly plating the conductive metal and thickening the conductive metal by electroplating to form the conductive metal antenna.

15. The method of claim 12, further comprising applying a primer coat over the conductive metal antenna, and applying a top coat over the primer coat, wherein the primer includes a polymer, and wherein the top coat comprises a thermal curing resin or an ultraviolet-curing resin.

16. The housing for an electronic device of claim 1, further comprising a base coat over the conductive metal antenna and the exterior surface of the rigid substrate, wherein the base coat includes a polymer and a pigment.

17. The housing for an electronic device of claim 16, further comprising a top coat over the base coat, wherein the top coat comprises a thermal curing resin or an ultraviolet-curing resin.

18. The method of claim 12, further comprising applying a base coat over the conductive metal antenna, and applying a top coat over the base coat, wherein the base coat includes a polymer and a pigment, and wherein the top coat comprises a thermal curing resin or an ultraviolet-curing resin.

\* \* \* \* \*